(No Model.)
G. B. DAVIS.
SLED RUNNER.
No. 547,064.  Patented Oct. 1, 1895.
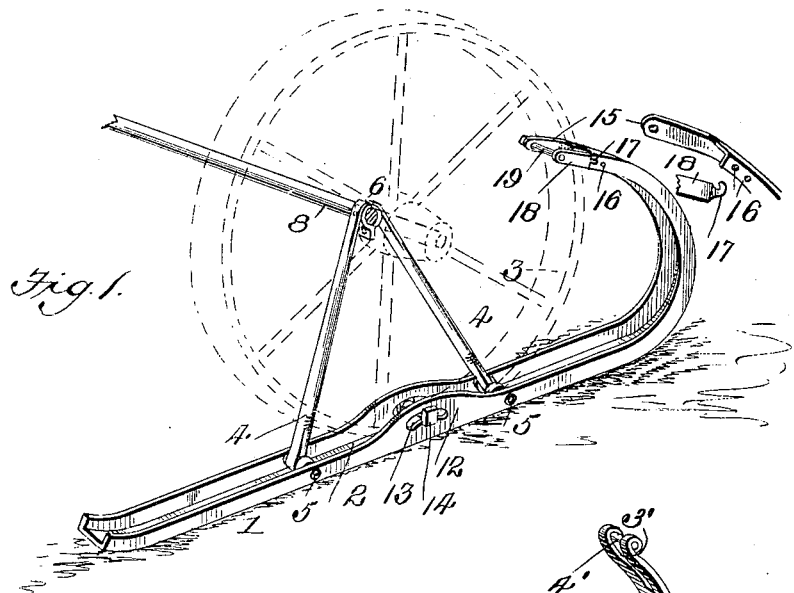
Fig. 1.
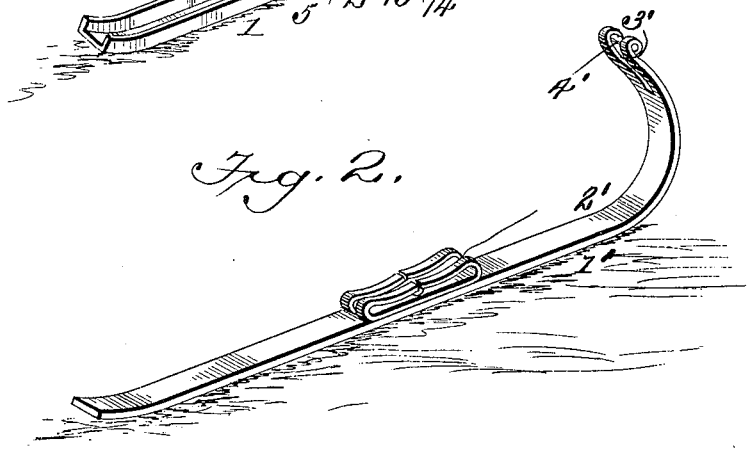
Fig. 2.
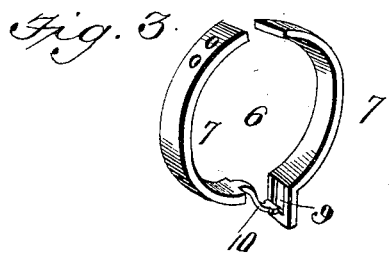
Fig. 3.
Fig. 4.
Witnesses
Inventor
George B. Davis,
By H. B. Willson
Attorney

UNITED STATES PATENT OFFICE.

GEORGE B. DAVIS, OF DETROIT, MICHIGAN.

SLED-RUNNER.

SPECIFICATION forming part of Letters Patent No. 547,064, dated October 1, 1895.

Application filed December 27, 1894. Serial No. 533,042. (No model.)

*To all whom it may concern:*

Be it known that I, GEORGE B. DAVIS, a citizen of the United States, residing at Detroit, in the county of Wayne and State of Michigan, have invented certain new and useful Improvements in Runners or Shoes for Sleds; and I do declare the following to be a full, clear, and exact description of the invention, such as will enable others skilled in the art to which it appertains to make and use the same.

My invention has relation to sled runners or shoes, and among the objects in view is to provide a simple and inexpensive runner or shoe which is adapted to be readily attached to and detached from a wagon or similar vehicle when desired, said runner or shoe being so constructed that the weight of the vehicle serves to cause the connecting-braces and clamp to tightly clamp or secure the runner to the axle or other bearing on the vehicle.

With the above and other objects in view the invention consists in the novel construction, arrangement, and combination of parts, as hereinafter fully described, illustrated in the drawings, and pointed out in the appended claims.

In the drawings, Figure 1 is a perspective view of the improved runner or shoe, braces, and clamp, and showing in dotted lines a wheel and axle of a vehicle to which the device is applied. Fig. 2 is a like view of a modified construction of runner. Fig. 3 is a detail view of the detachable clamping-plate seen in Fig. 1. Fig. 4 is a cross-section of the runner seen in Fig. 1.

In carrying out my invention I provide the runner or shoe 1, which is made of U-shaped iron bent into the shape shown in Fig. 1, thus providing a gutter 2 for the reception of a vehicle-wheel 3. (Seen in dotted lines.)

4 indicates braces, which at their lower ends are pivotally connected by bolts 5 to the runner, and said braces approach each other at their upper ends and are there connected to a clamping device 6. The latter consists of two semicircular sections 7, which are adapted to embrace the axle 8 (seen in dotted lines) of the vehicle or some other bearing on the vehicle. One section of the clamp has a slot 9, into which is adapted to enter a tongue 10 on the other section, whereby the sections are connected together at their lower ends. The sections, instead of being semicircular, may be made of angular or other shape to adapt said sections to the configuration or shape of the bearing to which the clamp is applied.

The vertical portions or flanges of the runner are provided with enlargements or ears 12, between which the felly of a wheel is adapted to be received and held, and said ears have slots 13 to receive set-bolts 14 for securing the wheel in position.

At the extreme forward end the runner is provided with a plate 15, and has a socket or perforation 16 to receive the hook 17 on a plate 18, between which plates 15 and 18 the wheel rests and is held thereinbetween by a bolt 19, passed through the plates.

In the modified construction the runner 1' is of flat metal and is provided with a bent plate 2', between the forked ends of which the felly of a wheel can lie, while the forward end of the runner is slotted, as at 3', to receive the wheel, and the latter is secured therein by a bolt 4'.

In each construction it will be observed that the device may be quickly attached to and detached from a vehicle; and, furthermore, it will be observed that the weight of the vehicle causes the upper ends of the braces to more closely approach each other, thus causing the clamp to more tightly bind upon the axle.

Although I have described a runner or shoe made of a U shape and also a flat shape, it will be obvious that the same may be made of other shapes in transverse section—as, for instance, a concave or a semicircular or L shape—as will be obvious.

What I claim, and desire to secure by Letters Patent, is—

1. The herein described runner comprising the metallic strip or plate bent upwardly at the forward end, the angularly arranged braces pivotally connected at their lower ends to the runner strip or shoe, and the upper ends of the braces approaching each other, and a clamp comprising sections, secured at one end to the upper ends of the braces and a detachable connection between the lower ends of the braces, as specified.

2. The herein described runner comprising the metallic strip or plate bent upwardly at the forward end, the angularly arranged braces pivotally connected at their lower ends to the runner strip or shoe, and the upper ends of the braces approaching each other, and a clamp comprising sections, secured at one end to the upper ends of the braces, one of said sections being provided at its lower end with a slot, and a tongue at the lower end of the other section adapted to engage said slot, as specified.

3. The herein described runner comprising the metallic strip or plate bent upwardly and rearwardly at the forward end, the plate secured to said end of the runner strip, and a detachable plate on the opposite side of the runner strip, said plates having openings, and a bolt passing through said openings, as specified.

In testimony whereof I affix my signature in presence of two witnesses.

GEORGE B. DAVIS.

Witnesses:
S. E. JONES,
JOHN G. PATTERSON.